(12) United States Patent
Inoue et al.

(10) Patent No.: US 11,438,483 B2
(45) Date of Patent: Sep. 6, 2022

(54) COLOR TO GRAY DATA CONVERSION DETERMINED BETWEEN ASSIGNING GRAY VALUES BASED ON NUMBER OF COLORS AND COMBINING COLOR COMPONENTS AT PREDETERMINED RATIO

(71) Applicant: CANON KABUSHIKI KAISHA, Tokyo (JP)

(72) Inventors: Takuya Inoue, Ibaraki (JP); Tatsunori Suzuki, Yamagata (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/405,917

(22) Filed: Aug. 18, 2021

(65) Prior Publication Data

US 2022/0070333 A1 Mar. 3, 2022

(30) Foreign Application Priority Data

Aug. 25, 2020 (JP) .............................. JP2020-142112

(51) Int. Cl.
*H04N 1/40* (2006.01)
*H04N 1/00* (2006.01)
*H04N 1/409* (2006.01)
*H04N 1/56* (2006.01)

(52) U.S. Cl.
CPC ..... *H04N 1/40012* (2013.01); *H04N 1/00039* (2013.01); *H04N 1/4092* (2013.01); *H04N 1/56* (2013.01)

(58) Field of Classification Search
CPC ......... H04N 1/40012; H04N 1/54; H04N 1/56
See application file for complete search history.

(56) References Cited

U.S. PATENT DOCUMENTS

| 8,582,879 | B2 * | 11/2013 | Kuboyama | ........ H04N 1/40012 382/163 |
| 8,837,003 | B2 * | 9/2014 | Yabe | .................... H04N 1/2369 358/1.9 |
| 9,374,502 | B2 * | 6/2016 | Janssen | .............. H04N 1/40012 |

FOREIGN PATENT DOCUMENTS

JP 2017038242 A 2/2017

* cited by examiner

*Primary Examiner* — Scott A Rogers
(74) *Attorney, Agent, or Firm* — Canon U.S.A., Inc. IP Division

(57) ABSTRACT

In a case where a user manually selects an image to be converted into a monochrome image with distinguishability, the user is to take labor and may select an image unsuitable for conversion into a monochrome image with distinguishability. An attribute in a page of print data is analyzed for each page, and based on the attribute of the page, a distinguishability improvement method that performs conversion into gray data by using density difference or outline emphasis is switched.

19 Claims, 13 Drawing Sheets

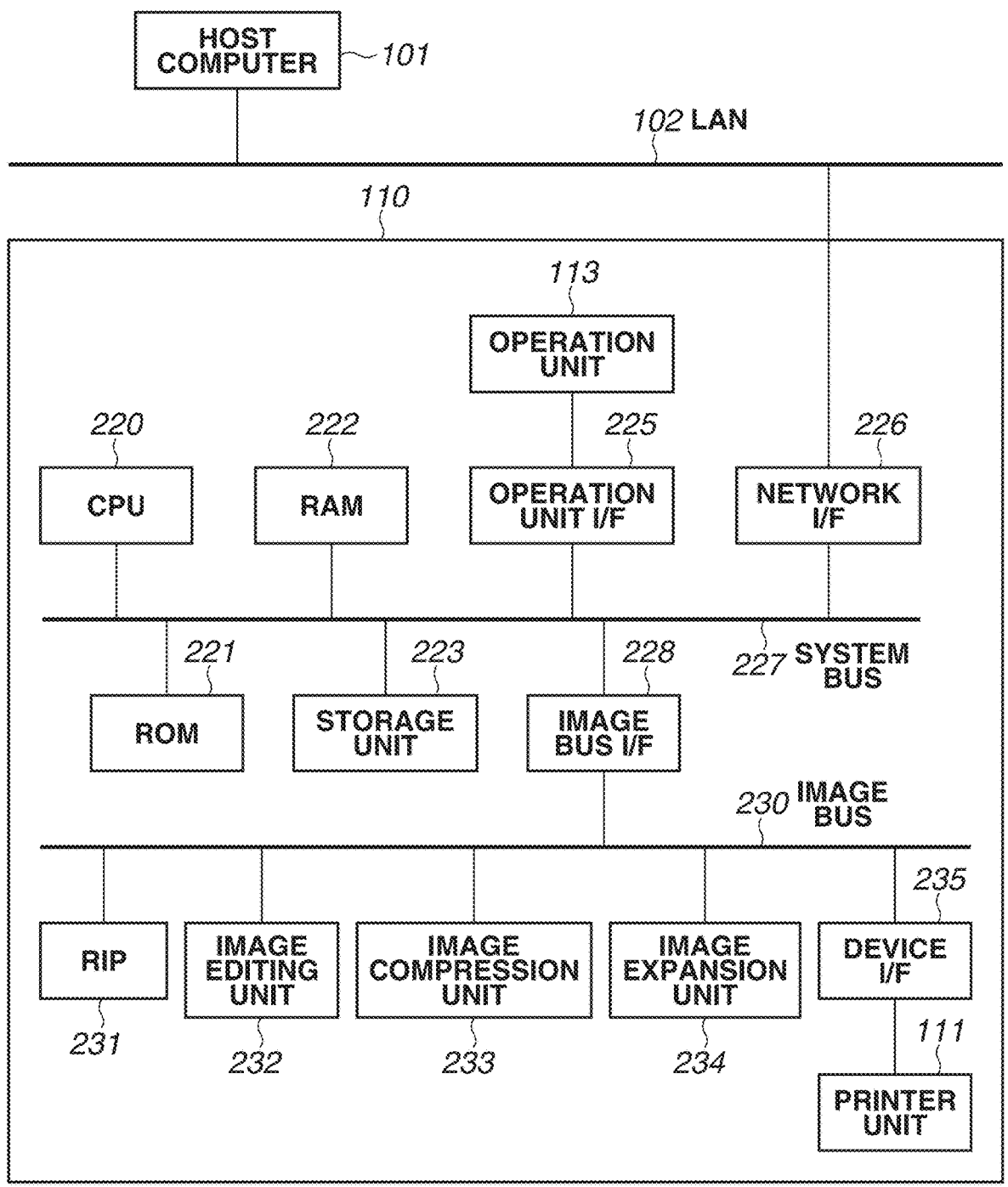

FIG.2A

```
┌─────────────────────────────────────────────┐
│              PRINT SETTING                  │
│                                             │
│  COLOR MODE                                 │
│  ┌───────────────────────────────────┐     │
│  │ MONOCHROME                    ▼   │     │
│  └───────────────────────────────────┘     │
│                                             │
│  COLOR CONVERSION METHOD                    │
│  ┌───────────────────────────────────────┐ │
│  │  ● AUTOMATIC         ○ NORMAL         │ │
│  │                                       │ │
│  │  ○ DENSITY DIFFERENCE  ○ OUTLINE     │ │
│  │    EMPHASIS              EMPHASIS    │ │
│  └───────────────────────────────────────┘ │
└─────────────────────────────────────────────┘
```

FIG.2B

```
┌─────────────────────────────────────────────┐
│  SELECTION OF MONOCHROME COLOR CONVERSION METHOD │
│                                             │
│    (    AUTOMATIC    )                      │
│                                             │
│    (    NORMAL       )                      │
│                                             │
│    ( DENSITY DIFFERENCE )                   │
│    ( EMPHASIS          )                    │
│                                             │
│    ( OUTLINE EMPHASIS  )                    │
│                                             │
│   ( CANCEL )                    ( OK )      │
└─────────────────────────────────────────────┘
```

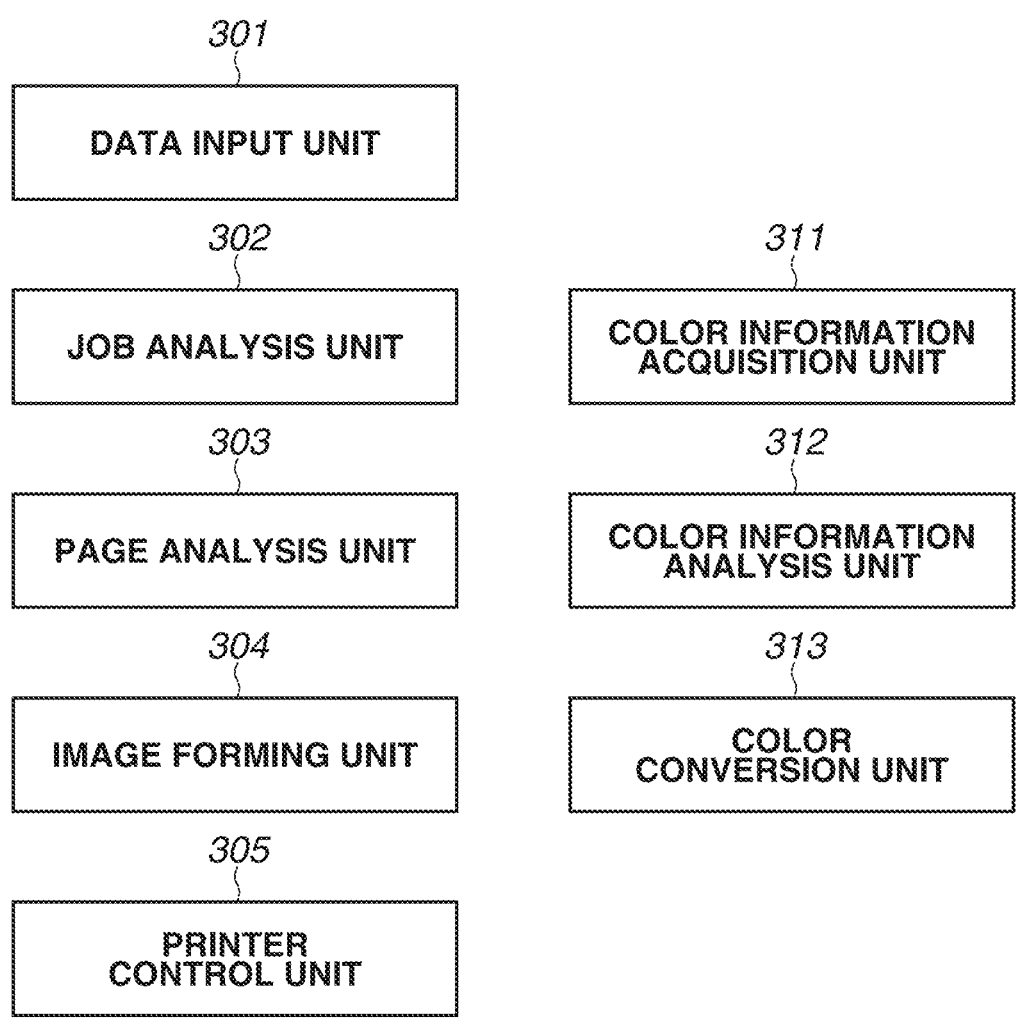

WITHOUT DENSITY DIFFERENCE CORRECTION

A  B  C  D

WITH DENSITY DIFFERENCE CORRECTION

A  B  C  D

WITHOUT DENSITY DIFFERENCE CORRECTION

WITH DENSITY DIFFERENCE CORRECTION

BEFORE PATTERN APPLICATION

■ A  ■ B  ■ C  ■ D

AFTER PATTERN APPLICATION

| | |
|---|---|
| JOB START COMMAND | 401 |
| COLOR MODE SETTING COMMAND<br>AUTOMATIC | 402 |
| — PARTIALLY OMITTED — | |
| DRAWING AREA SETTING COMMAND<br>LOWER LEFT END POSITION: 0, 6894,<br>UPPER RIGHT END POSITION: 4840, 0 | 411 |
| — PARTIALLY OMITTED — | |
| FILL PATTERN DESIGNATION COMMAND<br>FILL PATTERN: SOLID PAINTING<br>DRAWING OF LINE: NO DRAWING OF LINE<br>ROTATION: NO ROTATION<br>RIGHT/LEFT INVERSION: NO RIGHT/LEFT INVERSION | 412 |
| FILL COLOR DESIGNATION COMMAND<br>1000, 1000, 1000 | 413 |
| RECTANGLE DRAWING COMMAND<br>xMin: 301,     xMax: 4420,<br>yMin: 1244,   yMax: 5530 | 414 |
| — PARTIALLY OMITTED — | |
| PATH CONSTRUCTION START COMMAND | 415 |
| SUB-PATH START COMMAND<br>COORDINATE FORMAT: RELATIVE COORDINATE<br>MOVEMENT DESTINATION POSITION: 2361, 1407 | 416 |
| PATH POLYLINE COMMAND<br>POSITION OF CURRENT POINT:<br>   POSITION AT END OF COMMAND<br>ATTRIBUTE 1:<br>   RELATIVE COORDINATE, BEZIER CURVE<br>COORDINATE POINT SEQUENCE 1:<br>   (185, 0), (368, 28), (544, 83) | 417 |
| PATH POLYLINE COMMAND<br>POSITION OF CURRENT POINT:<br>   POSITION AT END OF COMMAND<br>ATTRIBUTE 1: RELATIVE COORDINATE, STRAIGHT LINE<br>COORDINATE POINT SEQUENCE 1: (-544, 1729) | 418 |
| PATH CLOSE COMMAND | 419 |
| PATH CONSTRUCTION END COMMAND | 420 |
| FILL PATTERN DESIGNATION COMMAND<br>FILL PATTERN: SOLID PAINTING<br>DRAWING OF LINE: NO DRAWING OF LINE<br>ROTATION: NO ROTATION<br>RIGHT/LEFT INVERSION: NO RIGHT/LEFT INVERSION | 421 |
| FILL COLOR DESIGNATION COMMAND<br>356, 607, 835 | 422 |
| PATH FILL COMMAND | 423 |
| — PARTIALLY OMITTED — | |
| PATH CONSTRUCTION START COMMAND | 424 |
| SUB-PATH START COMMAND<br>COORDINATE FORMAT: RELATIVE COORDINATE<br>MOVEMENT DESTINATION POSITION: 549, 3196 | 425 |
| PATH POLYLINE COMMAND<br>POSITION OF CURRENT POINT:<br>   POSITION AT END OF COMMAND<br>ATTRIBUTE 1: RELATIVE COORDINATE, BEZIER CURVE<br>COORDINATE POINT SEQUENCE 1:<br>   (13, -992), (820, -1789), (1812, -1789) | 426 |
| PATH POLYLINE COMMAND<br>POSITION OF CURRENT POINT:<br>   POSITION AT END OF COMMAND<br>ATTRIBUTE 1: RELATIVE COORDINATE, STRAIGHT LINE<br>COORDINATE POINT SEQUENCE 1: (0, 1812) | 427 |
| PATH CLOSE COMMAND | 428 |
| PATH CONSTRUCTION END COMMAND | 429 |
| FILL PATTERN DESIGNATION COMMAND<br>FILL PATTERN: SOLID PAINTING<br>DRAWING OF LINE: NO DRAWING OF LINE<br>ROTATION: NO ROTATION<br>RIGHT/LEFT INVERSION: NO RIGHT/LEFT INVERSION | 430 |
| FILL COLOR DESIGNATION COMMAND<br>439, 678, 278 | 431 |
| PATH FILL COMMAND | 432 |
| FILL COLOR DESIGNATION COMMAND<br>356, 607, 835 | 433 |
| RECTANGLE DRAWING COMMAND<br>xMin: 1664,    xMax: 1737,<br>yMin: 5281,   yMax: 5354 | 434 |
| — PARTIALLY OMITTED — | |
| SINGLE COLOR IMAGE/COLOR DESIGNATION COMMAND<br>SINGLE COLOR IMAGE COLOR: 349, 349, 349<br>IMAGE TYPE: CHARACTER IMAGE | 435 |
| SINGLE CHARACTER REGISTRATION COMMAND<br>CHARACTER CODE: 33<br>PATTERN WIDTH: 73,    PATTERN HEIGHT: 84<br>LEFT OFFSET: 2,    UPPER OFFSET: 84<br>CHARACTER PITCH: 77 | 436 |
| REGISTERED CHARACTER PRINTING COMMAND<br>PRINTING START POSITION: 1769, 5356 | 437 |
| — PARTIALLY OMITTED — | |
| PAGE BREAK COMMAND | 441 |
| — PARTIALLY OMITTED — | |
| JOB END COMMAND | 451 |

COLOR TO GRAY DATA CONVERSION DETERMINED BETWEEN ASSIGNING GRAY VALUES BASED ON NUMBER OF COLORS AND COMBINING COLOR COMPONENTS AT PREDETERMINED RATIO

BACKGROUND OF THE DISCLOSURE

Field of the Disclosure

The aspect of the embodiments relates to an image processing apparatus and an image processing method.

Description of the Related Art

In a case where a printing apparatus outputs a color document expressed in an RGB format or the like in a gray scale format, the printing apparatus generally converts input RGB values into values in a gray scale by using a conversion method (e.g., National Television System Committee (NTSC) conversion) performing conversion of the values at a predetermined ratio, and outputs the values in the gray scale. The color conversion performing conversion at a predetermined ratio (hereinafter, referred to as an all-color conversion) is effective for a document required to have gradation.

In the all-color conversion, however, color information is lost in a process of converting RGB (three channels) into gray (one channel). Thus, a plurality of colors expressed by different RGB values (colors) may be converted into the same gray value (or close gray values) in the all-color conversion, and the plurality of colors may become undistinguishable from one another. In particular, in an image drawn so that two colors are partially overlapped or in contact with each other, such as a pie chart, a boundary between the two colors may disappear. Thus, in a case where the image generated in such a manner is output as a monochrome image, distinguishability may be deteriorated compared with a case where the image is output as a color image.

There is a case where a person with color blindness sees colors expressed by different RGB values (colors) as the same color (or close colors). In such a case, even if a color document expressed in the RGB format or the like is output as a color image, distinguishability may be deteriorated since the person with color blindness may be unable to distinguish different colors, or the color image may be seen differently between a person with normal color vision and the person with color blindness.

To enhance distinguishability of an output image, a method of performing color conversion based on the number of colors used in a document has been proposed. Japanese Patent Application Laid-Open No. 2017-38242 discusses a method in which colors and objects used in a page of page description language (PDL) data are analyzed to acquire the number of used colors, and gray values with an equal density difference therebetween are assigned to the used colors. This makes it possible to convert color data into gray data that has distinguishability with visually-recognizable density difference.

For example, in the method discussed in Japanese Patent Application Laid-Open No. 2017-38242, the user determines whether to convert an image into a monochrome image with distinguishability or convert an image into a normal monochrome image.

SUMMARY OF THE DISCLOSURE

According to an aspect of the embodiments, an apparatus includes an acquisition unit configured to acquire a number of colors used in a page of color data, a determination unit configured to determine a gray data conversion method from a first gray data conversion method and a second gray data conversion method, the first gray data conversion method converting the color data into gray data while assigning, based on the acquired number of colors, different gray values to the colors used in the color data, the second gray data conversion method converting the color data into gray data by combining a plurality of color components of the color data at a predetermined ratio, and a conversion unit configured to convert the color data into the gray data by using the determined gray data conversion method.

Further features of the disclosure will become apparent from the following description of exemplary embodiments with reference to the attached drawings.

BRIEF DESCRIPTION OF THE DRAWINGS

FIG. 1 is a block diagram illustrating an example of a hardware configuration of an image processing apparatus.

FIGS. 2A and 2B are diagrams each illustrating an example of a screen displayed on an operation unit of the image processing apparatus.

FIG. 3 is a diagram illustrating an example of a software configuration of the image processing apparatus.

FIG. 13 is a diagram illustrating an image formation result of the print data according to the first exemplary embodiment.

DESCRIPTION OF THE EMBODIMENTS

Figure 4:
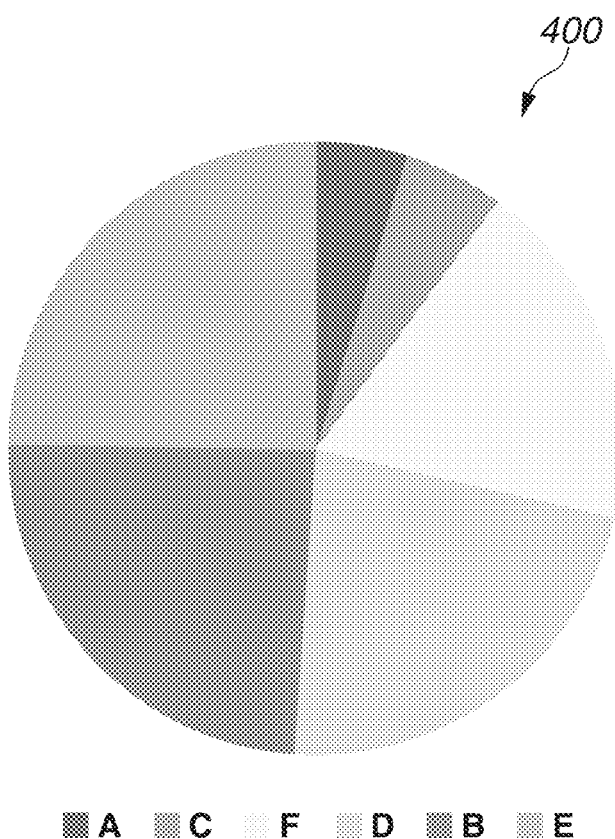
FIG. 4 is a diagram illustrating an example of print data according to a first exemplary embodiment.

Exemplary embodiments of the disclosure are described below with reference to drawings. Components described in the following exemplary embodiments represent forms as examples of the disclosure, and do not intend to limit the scope of the disclosure.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A first exemplary embodiment of the disclosure is described below with reference to the drawings. In the first exemplary embodiment, the number of colors used in each page of print data is acquired, and color conversion processing is switched in a case where the number of colors exceeds a predetermined number of colors.

FIG. 1 is a diagram illustrating a configuration example of a print system applied to the present exemplary embodiment. In this system, a host computer 101 and an image processing apparatus 110 are connected via a local area network (LAN) 102. A user generates page description language (PDL) data representing page information to be printed in the host computer 101, and transmits the PDL data from the host computer 101 to the image processing apparatus 110 via the LAN 102. The image processing apparatus 110 according to the present exemplary embodiment may be any of a multi-function printer (MFP) and a single function printer (SFP). The image processing apparatus 110 may be a printer other than the MFP and the SFP.

[Hardware Configuration of Image Processing Apparatus]

A hardware configuration example of the image processing apparatus 110 according to the first exemplary embodiment is described with reference to FIG. 1. The image processing apparatus 110 includes, for example, a printer unit 111 serving as an image output device. The image processing apparatus 110 acquires the PDL data (print data described in a page description language) from the host computer 101 via the LAN 102.

The printer unit 111 is connected to a device interface (I/F) 235, and performs processing to output image data generated by a central processing unit (CPU) 220 on a sheet (paper). The CPU 220 controls the whole (units) of the image processing apparatus 110. A random access memory (RAM) 222 is a system work memory for operation of the CPU 220. Further, the RAM 222 is used to temporarily store the acquired PDL data, intermediate data generated for image forming processing, and input image data, and is used as a work area for rendering processing. A read only memory (ROM) 221 is, for example, a boot ROM, and stores a boot program of the system. A storage unit 223 is, for example, a hard disk drive, and stores system software for various kinds of processing and the acquired PDL data.

An operation unit I/F 225 is an interface unit with an operation unit 113, and outputs operation screen data to the operation unit 113. The operation unit 113 includes a display unit for displaying various kinds of menus and information about print-instructed print data. Further, the operation unit I/F 225 transmits information input by the user via the operation unit 113 to the CPU 220. A network I/F 226 is an interface through which information is exchanged with an external apparatus (e.g., host computer 101) via the LAN 102. The CPU 220, the ROM 221, the RAM 222, the storage unit 223, the operation unit I/F 225, and the network I/F 226 are connected to a system bus 227.

An image bus I/F 228 is an interface that connects the system bus 227 and an image bus 230 that transfers image data at high speed, and serves as a bus bridge that converts a data structure. A raster image processor (RIP) 231, an image editing unit 232, an image compression unit 233, an image expansion unit 234, and the device I/F 235 are connected to the image bus 230. These units are hardware controlled by the CPU 220; however, these units may be configured to be sub-processors that can execute programs including commands different from commands by the CPU 220, as a matter of course. The RIP 231 analyzes PDL codes and intermediate data (display list, DL) based on an instruction from the CPU 220, and rasterizes the PDL codes and the intermediate data to an image in a raster format. The image editing unit 232 performs image editing in units of pixel, such as color space conversion and outline correction, on the image rasterized by the RIP 231. The image compression unit 233 compresses the image rasterized by the RIP 231 based on print processing, and stores the compressed image in the RAM 222 through the image bus I/F 228. The image expansion unit 234 expands the image stored in the RAM 222, and transfers an expansion result to the RIP 231 and the device I/F 235 via the image bus 230 based on the print processing. In a case where the user designates storage in a box, the image compression unit 233 and the image expansion unit 234 stores the image in the raster format rasterized by the RIP 231, and uses the image in printing in response to a user instruction. Further, in a case where rasterization processing by the RIP 231 is faster than print processing by the printer unit 111, the image compression unit 233 and the image expansion unit 234 may be used as a temporal storage. The device I/F 235 is an interface for transmitting data to the printer unit 111.

FIGS. 2A and 2B are diagrams each illustrating an example of an operation screen displayed on the operation unit 113 of the image processing apparatus. FIG. 2A illustrates an example of a print setting screen of a printer driver operating in the host computer 101. In a case where monochrome or automatic is selected as a color mode, a color conversion method becomes selectable, and any one of "normal (all-color conversion)", "density difference emphasis", "outline emphasis", and "automatic" is selectable. FIG. 2B illustrates an example of a print setting screen displayed on the operation unit 113, and illustrates the setting screen for selecting any one of "normal", "density difference emphasis", "outline emphasis", and "automatic". For example, in a case where print setting is not performed by the printer driver, a setting previously set in the image processing apparatus 110 is set as the print setting.

FIG. 3 is a diagram illustrating an example of a software module configuration in which software modules are loaded from the ROM 221 or the storage unit 223 to the RAM 222 and executed by the CPU 220 in the image processing apparatus according to the present exemplary embodiment.

A data input unit 301 is a module that receives print data from the host computer 101 via the network I/F 226 and the LAN 102. A job analysis unit 302 is a module that acquires and analyzes the setting illustrated in FIGS. 2A and 2B from the print data, or acquires preset set values if the setting cannot be acquired. More specifically, the job analysis unit 302 acquires and analyzes print setting information such as printer job language (PJL) and job definition format (JDF) included in the print data. A page analysis unit 303 is a module that performs information analysis for each page. More specifically, the page analysis unit 303 acquires PDL data included in the print data, analyzes a drawing command included in each page, and creates intermediate data. An image forming unit 304 is a module that controls the RIP 231, the image editing unit 232, the image compression unit 233, and the image expansion unit 234. A printer control unit 305 is a module that controls the device I/F 235 and the printer unit 111.

A color information acquisition unit 311 is a module that acquires settings relating to color processing included in the print data. Thus, in addition to the setting illustrated in FIGS. 2A and 2B, a setting of a gamma correction value and designation of International Color Consortium (ICC) profile to be used are also included; however, descriptions thereof are omitted in the present exemplary embodiment. A color information analysis unit 312 is a module that analyzes information relating to drawing colors from the drawing command included in each page analyzed by the page analysis unit 303. In the first exemplary embodiment, a case is described where values of colors and the number of colors used in a page are analyzed. A color conversion unit 313 is a module that performs conversion into gray data based on an analysis result of the color information analysis unit 312.

The software module configuration according to the first exemplary embodiment has been described above; however, a configuration in which sub-modules are present in each of the modules is also possible, as a matter of course. Hereinafter, processing from data input to output to the printer unit 111 according to the first exemplary embodiment is described with reference to a flowchart.

FIG. 13 illustrates an example of the print data received by the data input unit 301 from the host computer 101 via the network I/F 226 and the LAN 102. An image 400 in FIG. 4 represents an image formation result of the print data in FIG. 13.

A configuration outline of the entire print data is described. A job start command 401 represents a head of the print data, and setting information set to the entire print data follows immediately after the job start command 401. A drawing command for each page starts from a drawing area setting command 411. A break command 441 represents a page break, and a job end command 451 represents an end of the print data. Thus, an item "automatic" of a color mode setting command 402 is a set value effective for all pages included before the job end command 451. Before the drawing area setting command 411, commands about output resolution designation, output sheet size designation, sheet feeding cassette designation, double-sided printing designation, staple designation, and the like are also included; however, descriptions of the commands are omitted because the commands are unnecessary for the present exemplary embodiment.

The drawing area setting command 411 designates a width and a height of an entire drawing area. Values reflecting an output sheet size, output resolution, and an effective printing area of the printer unit 111 are set as the width and the height of the entire drawing area.

A fill pattern designation command 412, a fill color designation command 413, and a rectangle drawing command 414 are background color drawing commands for an entire graph area including a pie chart portion and a legend portion drawn in the image 400. The fill pattern designation command 412 represents a single-color fill, the fill color designation command 413 represents designation of white as the color, and the rectangle drawing command 414 presents designation of a rectangular range to which the designated fill method is applied.

A path construction command 415 to a path fill command 423, and a path construction command 424 to a path fill command 432 are examples of drawing commands to draw sectors of the pie chart portion drawn in the image 400. A Bezier curve is used for an arc of the sector, and a straight line to the center is represented by relative coordinate designation. A fill color designation command 433 to a registered character printing command 437 are examples of drawing commands to draw characters and rectangles of the legend portion drawn in the image 400.

Figure 5:
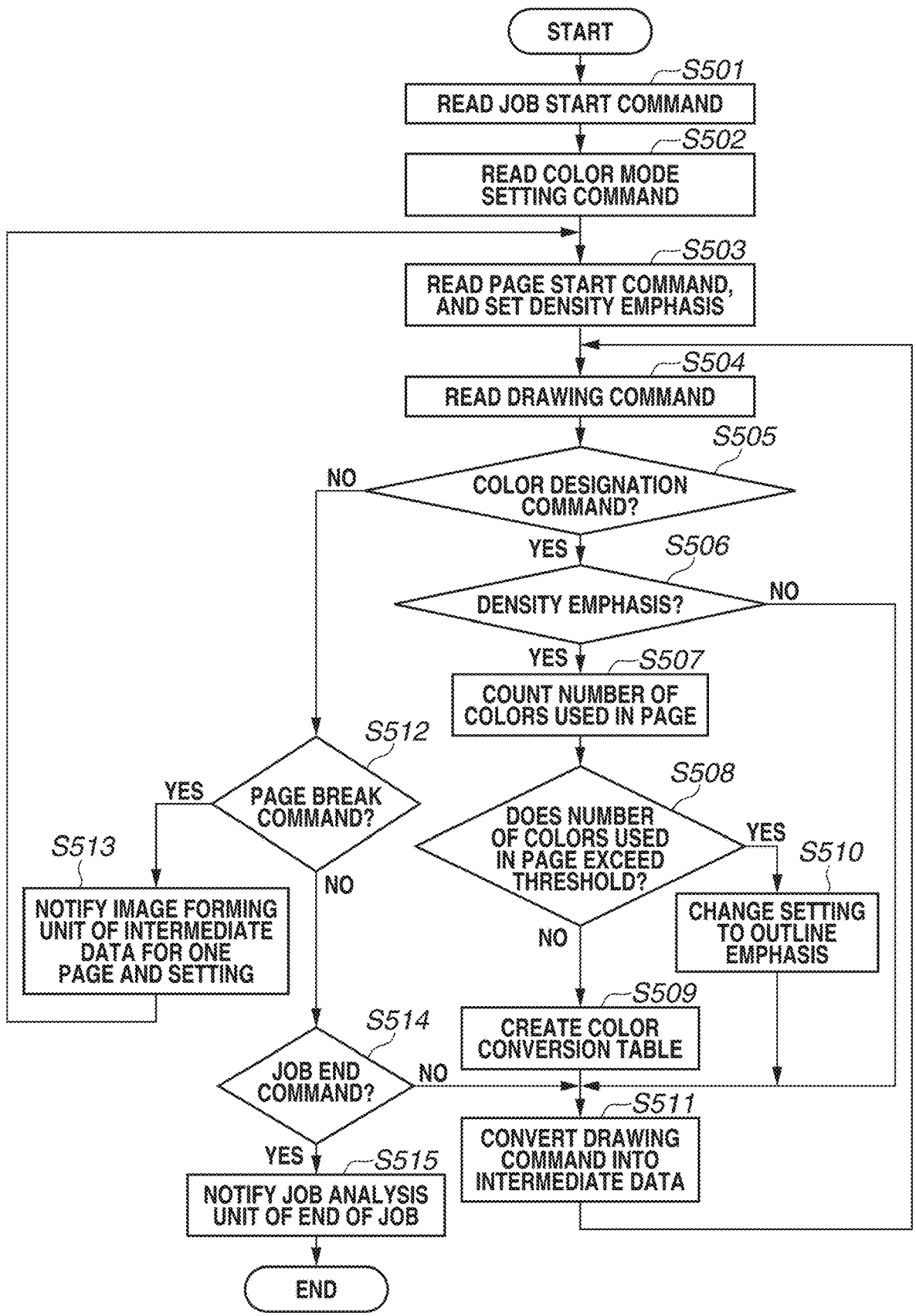
FIG. 5 is a flowchart illustrating display list (DL) generation processing according to the first exemplary embodiment.

Automatic switching of the color conversion method using the number of colors as a threshold in to the first exemplary embodiment is described with reference to FIG. 5.

In step S501, the job analysis unit 302 reads the job start command 401 from the input data (PDL data) acquired by the data input unit 301. Subsequently, in step S502, the job analysis unit 302 reads the color mode setting command 402 by using the color information acquisition unit 311. Processing performed in a case where the job requires conversion into gray data and the color conversion method is set to "automatic" as a reading result of the color information acquisition unit 311 is described. In a case of other designations, the processing is performed in a manner similar to an existing technique. Thus, description of the processing is omitted.

In step S503, the page analysis unit 303 reads a page start command. In a case where the color conversion method of the color mode setting command 402 read in step S502 is set to "automatic", "density emphasis" is set as an initial value of the color conversion method to a page at the page start. Further, a count value of the number of colors in the page for density emphasis processing is initialized to zero. In step S504, the page analysis unit 303 reads a drawing command. In step S505, in a case where the read drawing command is a command relating to color designation, for example, a fill color designation command (YES in step S505), the processing proceeds to step S506. In step S506, the page analysis unit 303 checks whether the color conversion method is set to "density emphasis". In a case where the color conversion method is set to "density emphasis" (YES in step S506), the page analysis unit 303 notifies the color information analysis unit 312 of contents of the command. In step S507, the color information analysis unit 312 counts the number of colors used in the page from the drawing command relating to the color designation read by the page analysis unit 303. In the counting, if a color has the color value that is already used in the page, the color information analysis unit 312 does not count the color in the number of colors. In step S507, the number of colors may be counted for each object in the page. In a case where the number of colors for each object exceeds a threshold in step S508 (YES in step S508), the processing proceeds to step S510. In a case where the number of colors for each object is less than or equal to the threshold in step S508 (NO in step S508), the processing proceeds to step S509.

Next, in step S508, the color information analysis unit 312 determines whether the number of colors used in the page exceeds a predetermined threshold. More specifically, the color information analysis unit 312 determines whether the color data can be converted into gray data having visually-recognizable density difference between colors, for example, whether the total number of colors exceeds the number of gradations of gray data expressible by the printer unit 111. In a case where distinguishability cannot be expressed based on the density difference, the color conversion method is switched to a color conversion method using outline emphasis. In a case where the number of colors used in the page does not exceed the predetermined threshold (NO in step S508), the processing proceeds to step S509. In step S509, the color information analysis unit 312 performs processing to create a color conversion table of color data in order to provide density difference. The color conversion table can be created by an existing technique. Thus, description of the color conversion table is omitted. In a case where the number of colors used in the page exceeds the predetermined threshold (YES in step S508), the processing proceeds to step S510. In step S510, creation of the color conversion table is stopped, and the color conversion unit 313 changes the setting of the color conversion method from "density emphasis" to "outline emphasis". When the "outline emphasis" is set, the color conversion unit 313 notifies the image forming unit 304 of a rule to switch an attribute associated with the object to an attribute for the outline emphasis.

In step S511, the drawing command is converted into intermediate data. More specifically, the drawing command that is expressed by the relative coordinate and the Bezier curve and registered characters (font) are converted into a path point sequence of an absolute coordinate based on actual output resolution and a sheet size.

The page analysis unit 303 repeats the processing from step S504 to step S511 until the drawing command ends. In the process, in a case where the read drawing command is a page break command in step S512 (YES in step S512), in step S513, the page analysis unit 303 adds a command representing page end to the intermediate data, and notifies the image forming unit 304 and the RIP 231 of the intermediate data for one page and the color conversion method. In step S514, in a case where the page analysis unit 303 detects a job end command (YES in step S514), the processing proceeds to step S515. In step S515, the page analysis unit 303 notifies the job analysis unit 302 that all pages included in the job have been converted into intermediate data. Then, the processing of the sequence ends.

Figure 6:
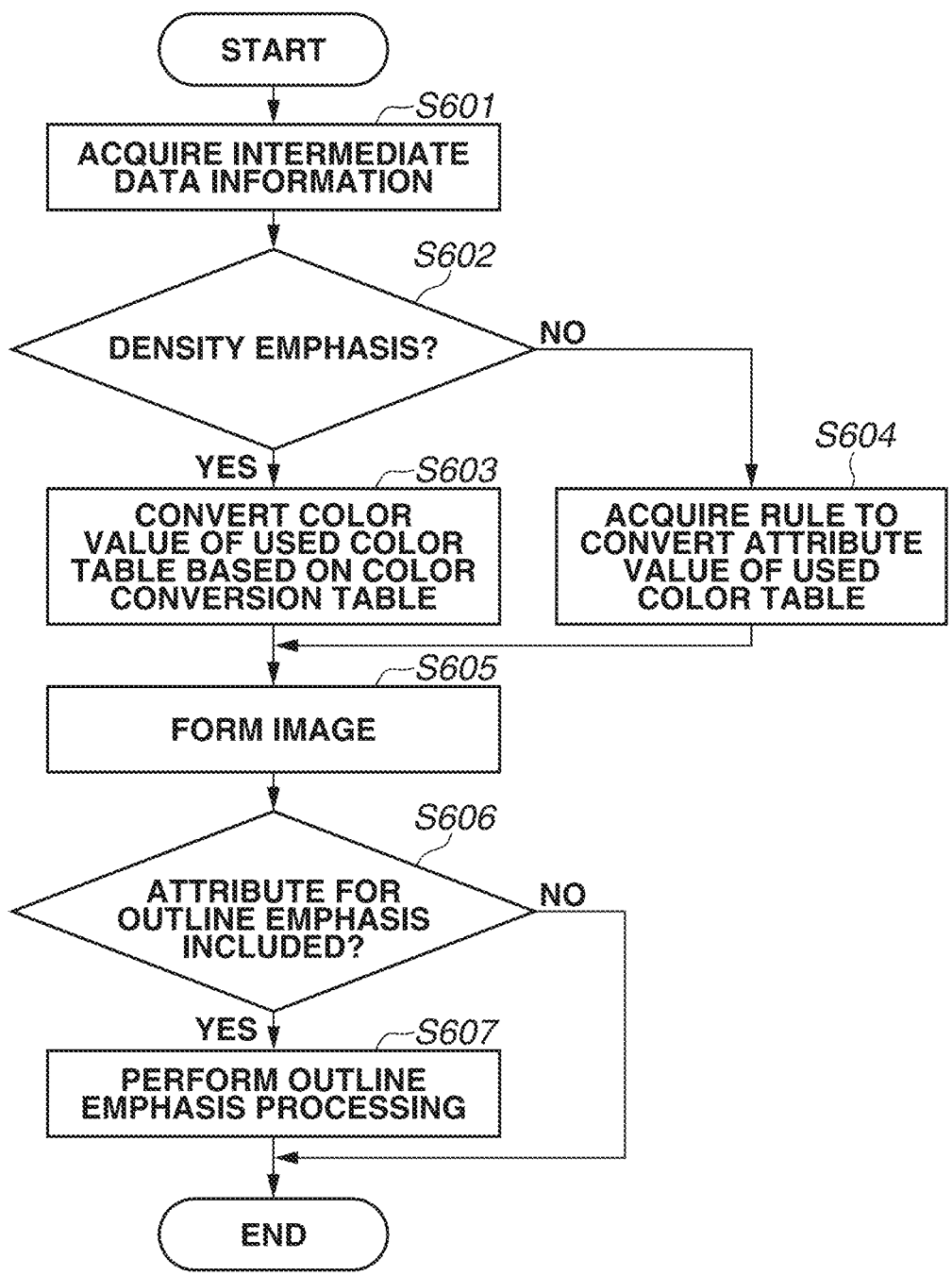
FIG. 6 is a flowchart illustrating image forming processing according to the first exemplary embodiment.

FIG. 6 is a flowchart illustrating image forming processing performed by the image forming unit 304 having received the notification that the intermediate data for one page has been created.

In step S601, a location of the intermediate data, a location of the color conversion table, and a color conversion method to be performed are acquired. In step S602, in a case where the density emphasis is selected (YES in step S602), the processing proceeds to step S603. In step S603, color values of a used color table of the intermediate data are converted by using the color conversion table (first gray data conversion method). In step S603, chromatic color data, which is the intermediate data, is converted into achromatic gray data, which is the intermediate data. In step S603, conversion is performed to assign different gray values with an equal difference therebetween to the plurality of colors used in the color data. For example, a gray value 50 is assigned to a red color, a gray value 100 is assigned to a blue color, and a gray value 150 is assigned to a green color. In step S602, in a case where the outline emphasis is selected (NO in step S602), the processing proceeds to step S604. In step S604, the rule to switch the attribute to the attribute for the outline emphasis is acquired. In step S605, the image forming unit 304 performs the image forming processing to convert the intermediate data into an image in a raster format based on the output resolution and the sheet size by following the attribute switching rule if present or by using the original attribute if the attribute switching rule is not present. In step S606, in a case where the attribute for the outline emphasis is included (YES in step S606), the processing proceeds to step S607. In step S607, the image forming unit 304 performs outline emphasis processing and performs gray scale conversion (second gray data conversion method). In step S607, the chromatic color data, which is the intermediate data, is converted into achromatic gray data, which is the intermediate data. In the outline emphasis processing in step S607, a plurality of color components (e.g., red, green, and blue components) constituting the color data is combined at a predetermined ratio (e.g., 0.3R+0.6G+0.1B) for each pixel to convert the color data into gray data, and an edge portion of the gray data is emphasized. Specific methods of the outline emphasis processing and the gray scale conversion processing are not different from methods in an existing technique. Thus, descriptions of the outline emphasis processing and the gray scale conversion processing are omitted. After the outline emphasis processing in step S607 is performed, rendering processing is performed by using the gray data that is the intermediate data after conversion to generate image data. As described above, it is determined whether the gray data conversion is to be performed by using the first gray data conversion method or the second gray data conversion method based on the number of colors used in the page.

The processing described above is the image forming processing performed by the image forming unit 304 having received the notification that the intermediate data for one page has been created, and the processing is executed by the RIP 231 and the image editing unit 232 in response to an instruction from the page analysis unit 303 executed by the CPU 220. Accordingly, the job analysis and the page analysis illustrated in FIG. 5 are operated in parallel with the image forming processing illustrated in FIG. 6.

In the present exemplary embodiment, the number of colors used in each page of the print data is acquired, and the color conversion processing can be switched in the case where the number of colors exceeds the predetermined number of colors. This makes it possible to provide the user with the function of "automatically" selecting and switching the color conversion method.

A second exemplary embodiment of the disclosure is described below with reference to drawings. In the second exemplary embodiment, the color conversion processing suitable for the print data is switched based on tendency of the drawing command in addition to the number of colors used in each page of the print data. A configuration of a print control apparatus according to the second exemplary embodiment is similar to the configuration thereof according to the first exemplary embodiment illustrated in FIG. 1. Differences from the first exemplary embodiment are described below.

Automatic switching of the color conversion method based on the tendency of the drawing command in addition to the number of colors according to the first exemplary embodiment is described with reference to FIG. 7.

In step S701, the job analysis unit 302 reads the job start command 401 from the input data acquired by the data input unit 301. Subsequently, in step S702, the job analysis unit 302 reads the color mode setting command 402 by using the color information acquisition unit 311. Processing performed in a case where the job requires conversion into gray data and the color conversion method is set to "automatic" as a reading result of the color information acquisition unit 311 is described. In the case of other designations, the processing is performed in a manner similar to an existing technique. Thus, description of the processing is omitted.

In step S703, the page analysis unit 303 reads a page start command. In a case where the color conversion method of the color mode setting command 402 read in step S702 is set to "automatic", "density emphasis" is set as an initial value of the color conversion method to a page at the page start. Further, a count value of the number of colors in the page for density emphasis processing is initialized to zero. A density emphasis suitability flag for determining whether the page is suitable for density emphasis is initialized to "unsuitable".

In step S704, the page analysis unit 303 reads a drawing command. In step S705, in a case where the read drawing command is a command relating to drawing in the page, for example, a fill color designation command (YES in step S705), the processing proceeds to step S706. In step S706, the page analysis unit 303 checks whether the color conversion method is set to "density emphasis". In a case where the color conversion method is set to "density emphasis" (YES in step S706), the page analysis unit 303 notifies the color information analysis unit 312 of contents of the command. In step S707, the color information analysis unit 312 counts the number of colors used in the page from the drawing command relating to the color designation read by the page analysis unit 303. In the counting, if a color has the count value that is already used in the page, the color information analysis unit 312 does not count the color in the number of colors.

Figure 10A:
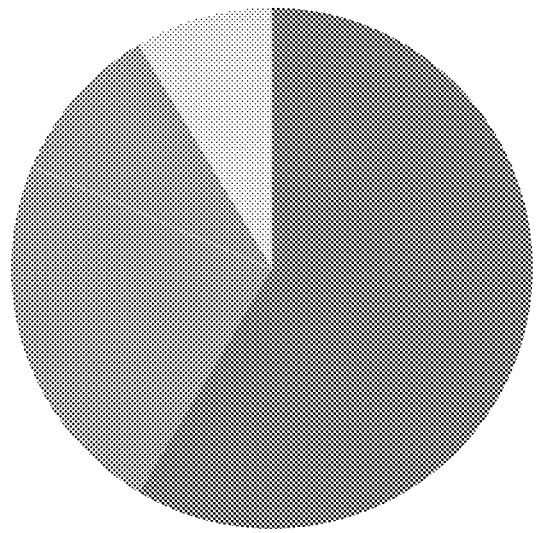
FIGS. 10A and 10B are diagrams illustrating exemplary pie charts before and after density difference emphasis according to the second exemplary embodiment.
Figure 10B:
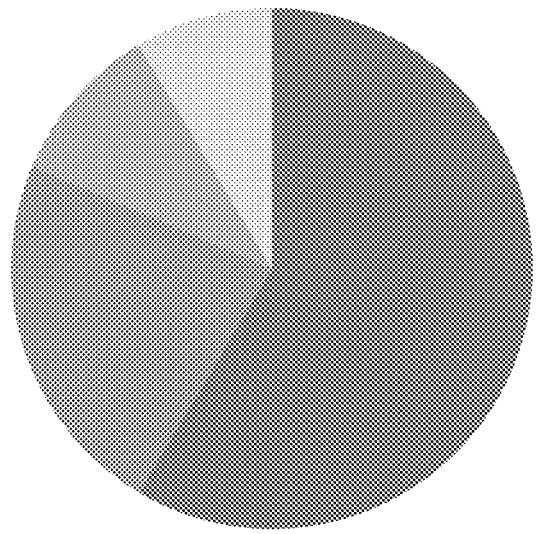
Figure 11A:
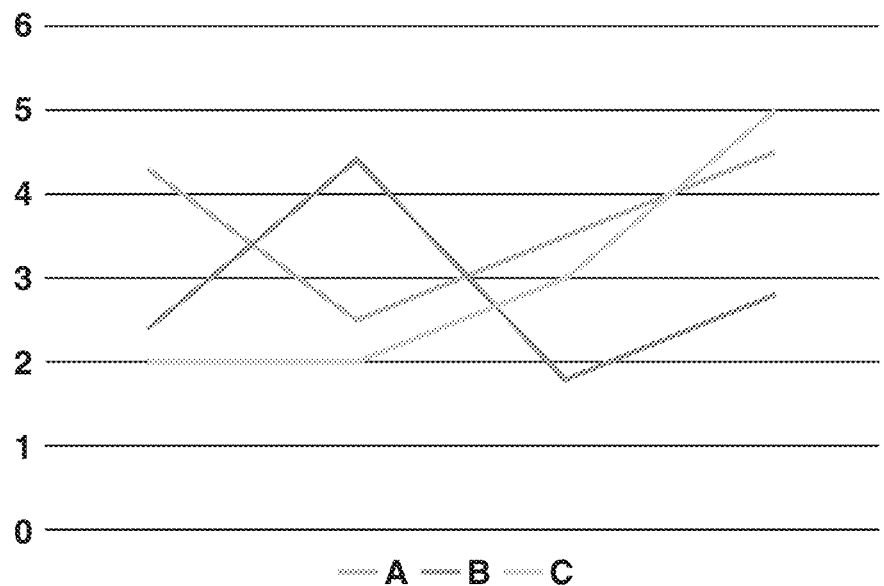
FIGS. 11A and 11B are diagrams illustrating exemplary line graphs before and after the density difference emphasis according to the second exemplary embodiment.
Figure 11B:
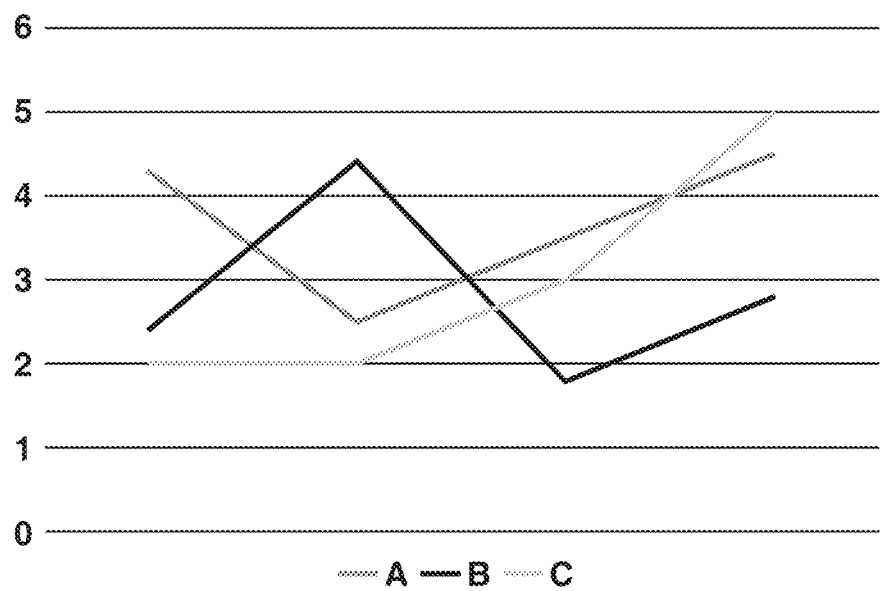

Next, in step S708, the color information analysis unit 312 determines whether the number of colors used in the page exceeds a predetermined threshold. More specifically, the color information analysis unit 312 determines whether the color data can be converted into gray data having visually-recognizable density difference between colors, for example, whether the total number of colors exceeds the number of gradations of gray data expressible by the printer unit 111. In a case where distinguishability cannot be expressed based on the density difference, the color conversion method is switched to a color conversion method using outline emphasis. In a case where the number of colors used in the page does not exceed the predetermined threshold (NO in step S708), the processing proceeds to step S709. In step S709, the color information analysis unit 312 analyzes the drawing tendency in the page to determine whether the page is suitable for density emphasis. More specifically, the color information analysis unit 312 analyzes whether the page has characteristics suitable for the density emphasis from the command relating to the drawing of the page read by the page analysis unit 303. In the example illustrated in FIG. 4 according to the first exemplary embodiment, drawing including the pie chart portion and the legend portion corresponding to the colors of the pie chart can be detected from contents of the width and the height, the coordinate information, and the color information of the consecutive drawing commands. In a case where the pie chart portion and the legend portion are included as a set, density difference facilitates identification of correspondence relationship. Thus, the color information analysis unit 312 determines that the page is suitable for the density emphasis. Other examples of the drawing suitable for the density emphasis include a drawing including a bar graph portion and a legend portion as a set, and a drawing including a line graph portion and a legend portion as a set. FIGS. 10A and 10B illustrate conceptual images of the pie chart portion and the legend portion without a density difference correction and with the density difference correction, respectively. FIGS. 11A and 11B illustrate conceptual images of the line graph portion and the legend portion without the density difference correction and with the density difference correction, respectively. It is evident from a comparison between the image before the density difference is provided (FIG. 10A and FIG. 11A) and the image after the density difference is provided (FIG. 10B and FIG. 11B) that the color correspondence relationship between the legend portion and the graph portion are easily identified in FIG. 10B and FIG. 11B, as compared with FIG. 10A and FIG. 11A. In a case where the color information analysis unit 312 detects the drawing suitable for the density emphasis as a result of the analysis, the color information analysis unit 312 changes setting of the density emphasis suitability flag to "suitable". In a case where the color information analysis unit 312 does not detect the drawing suitable for the density emphasis as the result of the analysis, the color information analysis unit 312 leaves the density emphasis suitability flag set to "unsuitable". In some cases, it is not possible to determine whether the page is suitable for the density emphasis unless the analysis is performed to the end. Thus, while the number of colors used in the page does not exceed the predetermined threshold, in step S710, the processing to create the color conversion table of the color data is continuously performed in order to provide the density difference. The color conversion table can be created by an existing technique. Thus, description of the color conversion table is omitted. In a case where the number of colors used in the page exceeds the predetermined threshold (YES in step S708), the processing proceeds to step S711. In step S711, the color information analysis unit 312 sets the density emphasis suitability flag to "unsuitable" and stops creation of the color conversion table, and the color conversion unit 313 changes the setting of the color conversion method from "density emphasis" to "outline emphasis". When the "outline emphasis" is set, the color conversion unit 313 notifies the image forming unit 304 of the rule to switch the attribute associated with the object to the attribute for the outline emphasis.

Figure 7:
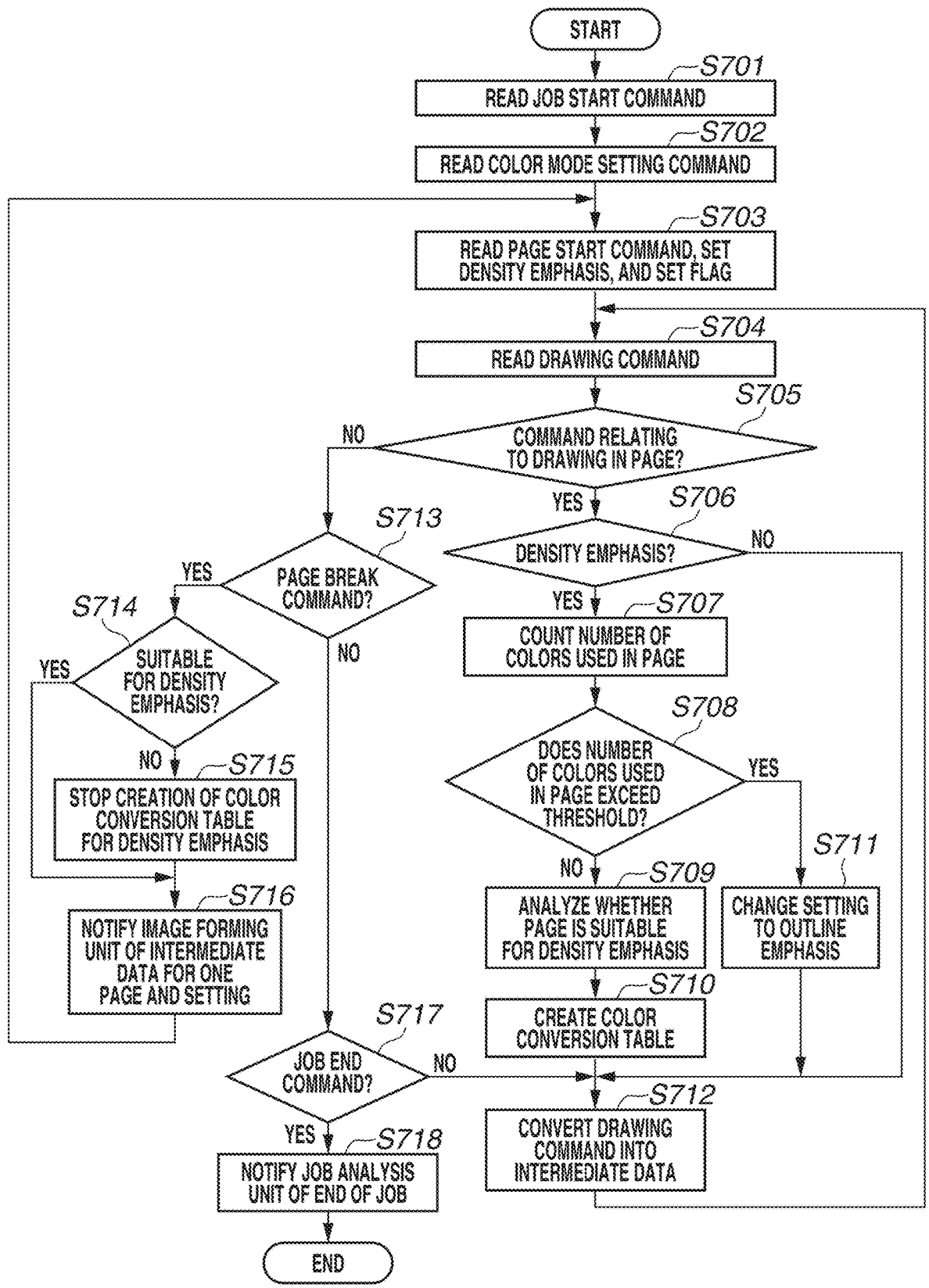
FIG. 7 is a flowchart illustrating DL generation processing according to a second exemplary embodiment.

In FIG. 7, the processing in step S709 is performed in a case where the result in step S708 is NO. Alternatively, the processing may proceed to step S710 in a case where the result in step S709 is YES, and the processing may proceed to step S711 in a case where the result in step S709 is NO, without performing the determination in step S708.

In step S712, the drawing command is converted into intermediate data. More specifically, the drawing command that is expressed by the relative coordinate and the Bezier curve and registered characters (font) are converted into a path point sequence on an absolute coordinate based on actual output resolution and a sheet size.

The page analysis unit 303 repeats the processing from step S704 to step S712 until the drawing command ends. In the process, in a case where the read drawing command is a page break command in step S713 (YES in step S713), in step S714, the page analysis unit 303 checks the density emphasis suitability flag. In a case where the density emphasis suitability flag is set to "suitable" (YES in step S714), the processing proceeds to step S716 in a state where the density emphasis is set. In a case where the density emphasis suitability flag is set to "unsuitable" (NO in step S714), the processing proceeds to step S715. In step S715, creation of the color conversion table is stopped, and the color conversion unit 313 changes the setting of the color conversion method from "density emphasis" to "outline emphasis". When the "outline emphasis" is set, the color conversion unit 313 notifies the image forming unit 304 of the rule to switch the attribute associated with the object to the attribute for the outline emphasis.

In step S716, the page analysis unit 303 adds a command representing page end to the intermediate data, and notifies the image forming unit 304 and the RIP 231 of the intermediate data for one page and the color conversion method. In step S717, in a case where the page analysis unit 303 detects the job end command (YES in step S717), the processing proceeds to step S718. In step S718, the page analysis unit 303 notifies the job analysis unit 302 that all pages included in the job have been converted into intermediate data. Then, the processing of the sequence ends.

In the present exemplary embodiment, the number of colors used in each page of the print data and the drawing tendency in the page are analyzed. In a case where the number of colors exceeds the predetermined number of colors, or based on the drawing tendency, the color conversion processing can be switched. This makes it possible to provide the user with the function of "automatically" selecting and switching the color conversion method.

More specifically, conversion is performed to assign different gray values to the plurality of colors used in the graph included in the page of the color data. With respect to the object other than the graph included in the page of the color data, the plurality of color components constituting pixels of the object is combined at a predetermined ratio to convert the color data into gray data, and an edge portion of the gray data is emphasized.

A third exemplary embodiment of the disclosure is described below with reference to drawings. In the second exemplary embodiment, the graph and the like are identified based on the tendency of the drawing command, and the color conversion method is switched. The color conversion method using the density difference, however, cannot perform expression exceeding the number of gradations of gray color. Thus, even with respect to the data requiring the color conversion using the density difference, such as a graph, the color conversion using the density difference cannot be performed if the number of colors in the page exceeds an upper limit. The third exemplary embodiment provides distinguishability among colors in number exceeding the number of gradations of gray color by further using a pattern image based on characteristics of a figure to be drawn while determining the tendency of the drawing command. A configuration of a print control apparatus according to the third exemplary embodiment is similar to the configuration thereof according to the first exemplary embodiment illustrated in FIG. 1. Differences from the first exemplary embodiment are described below.

Figure 8:
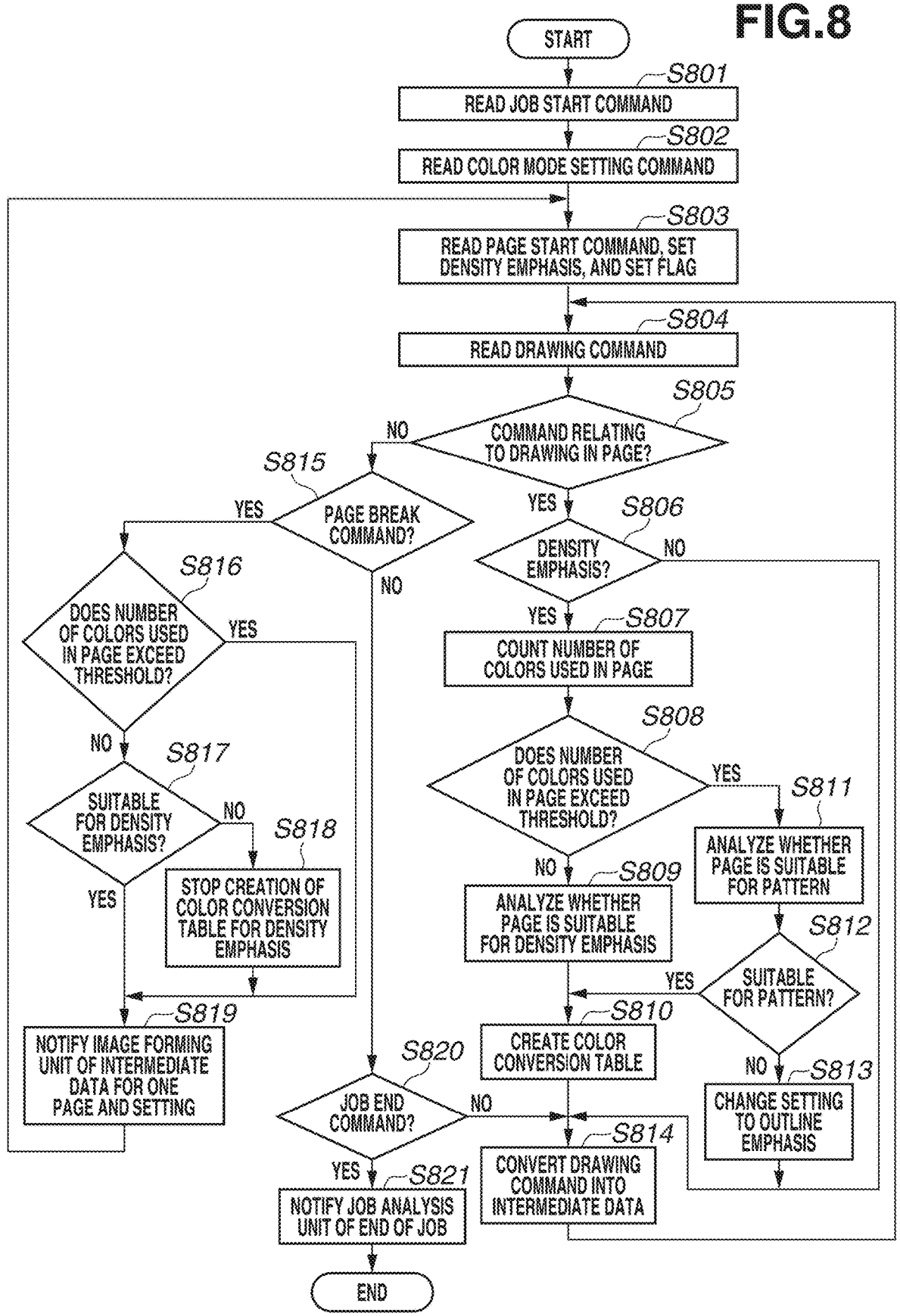
FIG. 8 is a flowchart illustrating DL generation processing according to a third exemplary embodiment.

Automatic switching of the color conversion method based on the tendency of the drawing command in addition to the number of colors according to the second exemplary embodiment is described with reference to FIG. 8.

In step S801, the job analysis unit 302 reads the job start command 401 from the input data acquired by the data input unit 301. Subsequently, in step S802, the job analysis unit 302 reads the color mode setting command 402 by using the color information acquisition unit 311. Processing performed in a case where the job requires conversion into gray data and the color conversion method is set to "automatic" as a reading result of the color information acquisition unit 311 is described. In the case of other designations, the processing is performed in a manner similar to an existing technique. Thus, description of the processing is omitted.

In step S803, the page analysis unit 303 reads a page start command. In a case where the color conversion method of the color mode setting command 402 read in step S802 is set to "automatic", "density emphasis" is set as an initial value of the color conversion method to a page at page start. Further, a count value of the number of colors in the page for density emphasis processing is initialized to zero. The density emphasis suitability flag for determining whether the page is suitable for the density emphasis is initialized to "unsuitable". A pattern suitability flag for determining whether the page is suitable for distinction by pattern images is initialized to "suitable".

In step S804, the page analysis unit 303 reads a drawing command. In step S805, in a case where the read drawing command is a command relating to drawing in the page, for example, a fill color designation command (YES in step S805), the processing proceeds to step S806. In step S806, the page analysis unit 303 checks whether the color conversion method is set to "density emphasis". In a case where the color conversion method is set to "density emphasis" (YES in step S806), the page analysis unit 303 notifies the color information analysis unit 312 of contents of the command. In step S807, the color information analysis unit 312 counts the number of colors used in the page from the drawing command relating to the color designation read by the page analysis unit 303. In the counting, if a color has the color value that is already used in the page, the color information analysis unit 312 does not count the color in the number of colors.

Figure 12A:
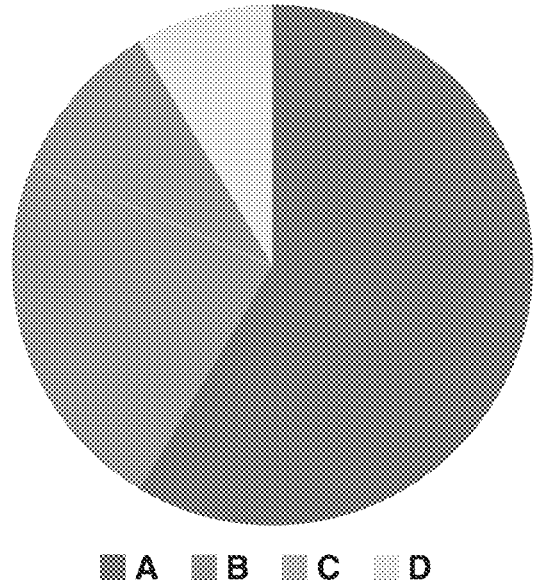
FIGS. 12A and 12B are diagrams illustrating exemplary pie charts before and after application of a pattern according to the third exemplary embodiment.
Figure 12B:
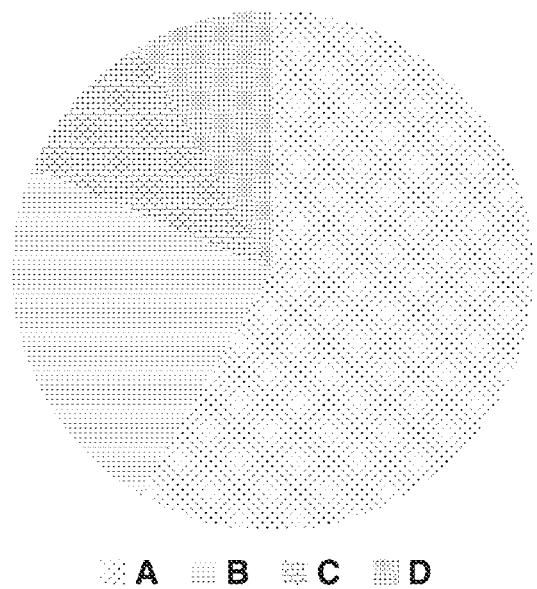

Next, in step S808, the color information analysis unit 312 determines whether the number of colors used in the page exceeds a predetermined threshold. More specifically, the color information analysis unit 312 determines whether the color data can be converted into gray data having visually-recognizable density difference between colors, for example, whether the total number of colors exceeds the number of gradations of gray data expressible by the printer unit 111. In a case where the number of colors used in the page does not exceed the predetermined threshold (NO in step S808), the processing proceeds to step S809. In step S809, the color information analysis unit 312 analyzes the drawing tendency in the page to determine whether the page is suitable for the density emphasis. In a case where the color information analysis unit 312 detects the drawing suitable for the density emphasis as a result of the analysis, the color information analysis unit 312 changes setting of the density emphasis suitability flag to "suitable". In a case where the color information analysis unit 312 does not detect the drawing suitable for the density emphasis as the result of the analysis, the color information analysis unit 312 leaves the density emphasis suitability flag set to "unsuitable". In some cases, it is not possible to determine whether the page is suitable for the density emphasis unless the analysis is performed to the end. Thus, while the number of colors used in the page does not exceeds the predetermined threshold, in step S810, the processing to create the color conversion table of the color data is continuously performed in order to provide the density difference. The color conversion table can be created by an existing technique. Thus, description of the color conversion table is omitted. In a case where the number of colors used in the page exceeds the predetermined threshold (YES in step S808), the processing proceeds to step S811. In step S811, the color information analysis unit 312 determines whether the colors in the page become easily distinguishable by using the pattern image in addition to the density emphasis. More specifically, the color information analysis unit 312 analyzes whether the page has characteristics suitable for patterns from the command relating to the drawing in the page read by the page analysis unit 303. In the example illustrated in FIG. 4 according to the first exemplary embodiment, drawing including the pie chart portion and the legend portion corresponding to the colors of the pie chart can be detected from contents of the width and the height, the coordinate information, and the color information of the consecutive drawing commands. In a case where the drawing including the pie chart portion and the legend portion as a set is detected, expression using pattern images facilitates identification of correspondence relationship. Thus, the color information analysis unit 312 determines that the page is suitable for the patterns. Other examples of the drawing suitable for patterns include a drawing including a bar graph portion and a legend portion as a set. FIGS. 12A and 12B illustrate conceptual images of the pie chart portion and the legend portion before and after application of the patterns. It is evident from FIG. 12B that using the pattern images in addition to the density difference facilitates identification of the correspondence relationship between the pie chart portion and the legend portion, as compared with FIG. 12A. In contrast, examples of a drawing unsuitable for the patterns include a drawing including a line graph portion and a legend portion as a set. For example, it is difficult to facilitate identification by replacing lines of the line graph portion illustrated in FIGS. 11A and 11B with the pattern images. Even if the patterns are applied to such a drawing, visibility is not improved. Thus, it is determined that such a drawing is not suitable for the patterns. In a case where the color information analysis unit 312 detects a drawing unsuitable for the patterns as a result of the analysis, the color information analysis unit 312 sets the pattern suitability flag to "unsuitable". In a case where the color information analysis unit 312 does not detect a drawing unsuitable for the patterns as a result of the analysis, the color information analysis unit 312 leaves the pattern suitability flag set to "suitable".

In a case where the pattern suitability flag is set to "suitable" in step S812 (YES in step S812), the processing proceeds to step S810. In step S810, the processing to create the color conversion table for the density emphasis is performed. In addition to the colors provided with the density difference, an item to convert a specific color into a specific pattern image is additionally registered in the color conversion table for the density emphasis. In a case where the pattern suitability flag is set to "unsuitable" (NO in step S812), the processing proceeds to step S813. In step S813, the color information analysis unit 312 stops creation of the color conversion table, and the color conversion unit 313 changes setting of the color conversion method from "density emphasis" to "outline emphasis". When the "outline emphasis" is set, the color conversion unit 313 notifies the image forming unit 304 of the rule to switch the attribute associated with the object to the attribute for the outline emphasis.

In step S814, the drawing command is converted into intermediate data. More specifically, the drawing command that is expressed by the relative coordinate and the Bezier curve and registered characters (font) are converted into a path point sequence of an absolute coordinate based on actual output resolution and a sheet size.

The page analysis unit 303 repeats the processing from step S804 to step S814 until the drawing command ends. In the process, in a case where the read drawing command is a page break command in step S815 (YES in step S815), in step S816, the page analysis unit 303 checks whether the number of colors used in the page exceeds the predetermined threshold. In step S816, in a case where the number of colors used in the page does not exceed the predetermined threshold (NO in step S816), the processing proceeds to step S817. In step S817, the page analysis unit 303 checks the density emphasis suitability flag. In a case where the density emphasis suitability flag is set to "suitable" (YES in step S817), the processing proceeds to step S819 in a state where the density emphasis is set. In a case where the density emphasis suitability flag is set to "unsuitable" (NO in step S817), the processing proceeds to step S818. In step S818, creation of the color conversion table is stopped, and the color conversion unit 313 changes the setting of the color conversion method from "density emphasis" to "outline emphasis". When the "outline emphasis" is set, the color conversion unit 313 notifies the image forming unit 304 of the rule to switch the attribute associated with the object to the attribute for the outline emphasis.

In step S819, the page analysis unit 303 adds a command representing page end to the intermediate data, and notifies the image forming unit 304 and the RIP 231 of the intermediate data for one page and the color conversion method. In step S820, in a case where the page analysis unit 303 detects the job end command (YES in step S820), the processing proceeds to step S821. In step S821, the page analysis unit 303 notifies the job analysis unit 302 that all pages included in the job have been converted into intermediate data. Then, the processing of the sequence ends.

Figure 9:
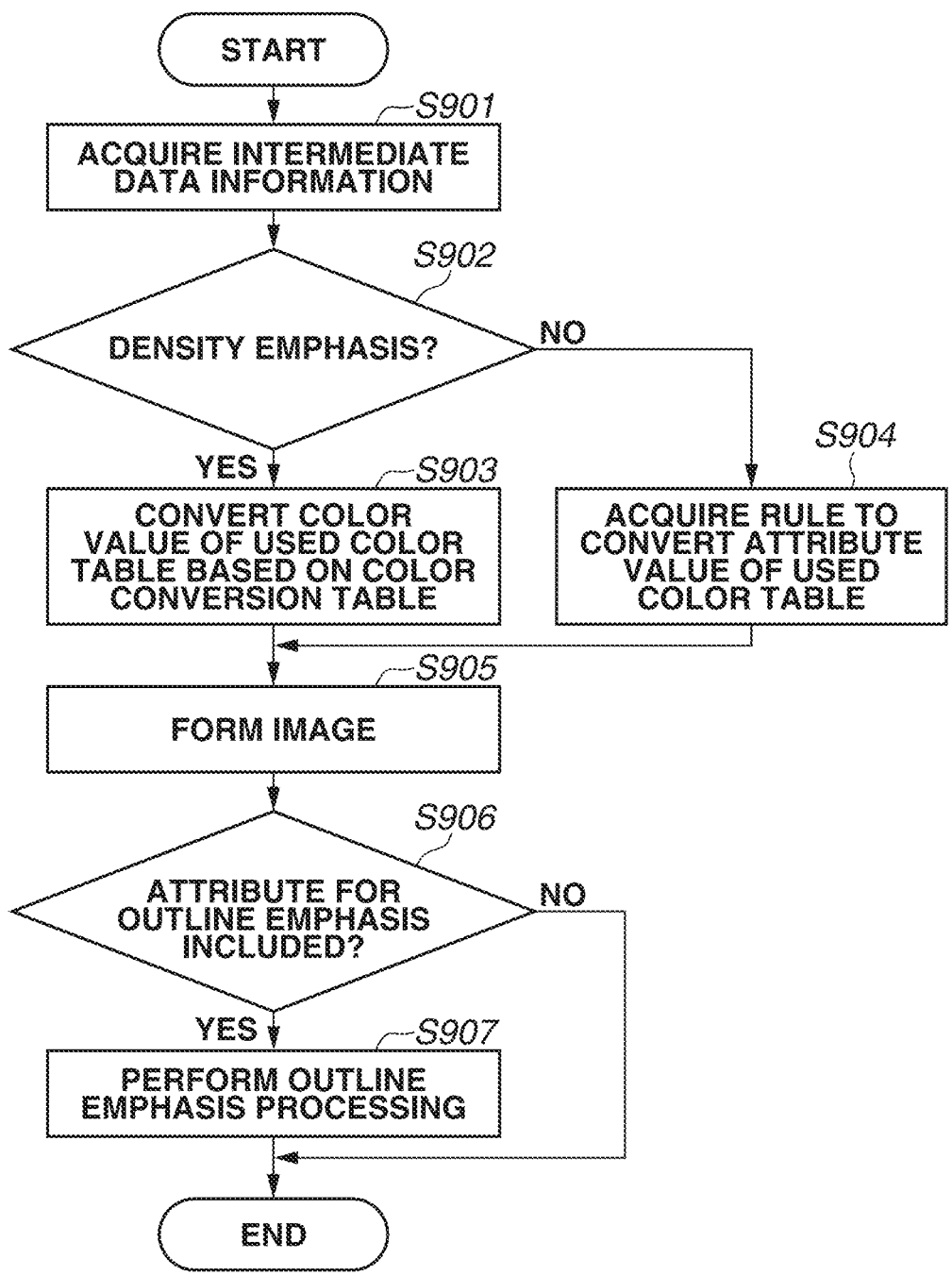
FIG. 9 is a flowchart illustrating image forming processing according to the third exemplary embodiment.

FIG. 9 is a flowchart illustrating image forming processing performed by the image forming unit 304 having received notification that the intermediate data for one page has been created.

In step S901, a location of the intermediate data, a location of the color conversion table, and a color conversion method to be performed are acquired. In step S902, in a case where the density emphasis is selected (YES in step S902), the processing proceeds to step S903. In step S903, color values in the used color table are converted into color values having density differences or pattern images by using the color conversion table. In step S902, in a case where the outline emphasis is selected (NO in step S902), the processing proceeds to step S904. In step S904, the rule to switch the attribute to the attribute for the outline emphasis is acquired. In step S905, the image forming unit 304 performs the image forming processing to convert the intermediate data into an image in a raster format based on the output resolution and the sheet size by following the attribute switching rule if present or by using the original attribute if the attribute switching rule is not present. In step S906, in a case where the attribute for the outline emphasis is included (YES in step S906), the processing proceeds to step S907. In step S907, the image forming unit 304 performs outline emphasis processing and performs gray scale conversion. Specific methods of the outline emphasis processing and the gray scale conversion processing are not different from methods in an existing technique. Thus, descriptions of the outline emphasis processing and the gray scale conversion processing are omitted.

The processing described above is the image forming processing performed by the image forming unit 304 having received the notification that the intermediate data for one page has been created, and the processing is executed by the RIP 231 and the image editing unit 232 in response to an instruction from the page analysis unit 303 executed by the CPU 220. Accordingly, the job analysis and the page analysis illustrated in FIG. 8 are operated in parallel with the image forming processing illustrated in FIG. 9.

In the present exemplary embodiment, the number of colors used in each page of the print data and the drawing tendency in the page are analyzed. Even in a case where the number of colors exceeds the predetermined number of colors, distinguishability can be improved by using the density difference and the patterns in a case where the page is suitable for the patterns based on the drawing tendency. In a case where the page is not suitable for the patterns based on the drawing tendency, the outline emphasis can be performed by switching the color conversion method. This makes it possible to provide the user with the function of "automatically" selecting and switching the color conversion method.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-142112, filed Aug. 25, 2020, which is hereby incorporated by reference herein in its entirety.

What is claimed is:

1. An apparatus comprising:
a generation unit configured to generate intermediate data for each page by analyzing page description language (PDL) data;
an acquisition unit configured to acquire a number of colors used in a page of color data of the intermediate data;
a determination unit configured to determine a gray data conversion method from a first gray data conversion method and a second gray data conversion method, the first gray data conversion method converting the color data into gray data while assigning, based on the acquired number of colors, different gray values to the colors used in the color data, the second gray data conversion method converting the color data into gray data by combining a plurality of color components of the color data at a predetermined ratio; and
a conversion unit configured to convert the color data into the gray data by using the determined gray data conversion method.

2. The apparatus according to claim 1, wherein, in a case where the acquired number of colors exceeds a threshold, the determination unit determines the gray data conversion method to the second gray data conversion method and, in a case where the acquired number of colors is less than or equal to the threshold, the determination unit determines the gray data conversion method to the first gray data conversion method.

3. The apparatus according to claim 1, wherein the first gray data conversion method converts the color data into the gray data while assigning the gray values with an equal difference to the plurality of colors used in the color data.

4. The apparatus according to claim 1, further comprising a generation unit configured to generate intermediate data for each page by analyzing page description language (PDL) data,
wherein the acquisition unit acquires the number of colors by counting a number of colors used in a page of the intermediate data.

5. The apparatus according to claim 4, wherein the conversion unit converts color data of the intermediate data into gray data of the intermediate data.

6. The apparatus according to claim 5, further comprising an image data generating unit configured to generate image data by performing rendering processing based on the converted gray data of the intermediate data.

7. The apparatus according to claim 1, wherein the conversion unit converts color data into gray data while assigning different gray values to a plurality of colors used in a graph included in a page of the color data, and converts values of a plurality of color components constituting pixels of an object other than the graph included in the page of the color data into gray values by combining the plurality of color components at a predetermined ratio and emphasizing an edge portion of the gray data.

8. A method comprising:
generating intermediate data for each page by analyzing page description language (PDL) data;
acquiring a number of colors used in a page of color data of the intermediate data;
determining a gray data conversion method from a first gray data conversion method and a second gray data conversion method, the first gray data conversion method converting the color data into gray data while assigning, based on the acquired number of colors, different gray values to the colors used in the color data, the second gray data conversion method converting the color data into gray data by combining a plurality of color components of the color data at a predetermined ratio; and
converting the color data into the gray data by using the determined gray data conversion method.

9. The method according to claim 8, wherein, in a case where the acquired number of colors exceeds a threshold, the determining determines the gray data conversion method to the second gray data conversion method and, in a case where the acquired number of colors is less than or equal to the threshold, the determining determines the gray data conversion method to the first gray data conversion method.

10. The method according to claim 8, wherein the first gray data conversion method converts the color data into the gray data while assigning the gray values with an equal difference to the plurality of colors used in the color data.

11. The method according to claim 8, further comprising generating intermediate data for each page by analyzing page description language (PDL) data,
wherein the acquiring acquires the number of colors by counting a number of colors used in a page of the intermediate data.

12. The method according to claim 8, wherein the converting converts color data of the intermediate data into gray data of the intermediate data.

13. The method according to claim 12, further comprising generating image data by performing rendering processing based on the converted gray data of the intermediate data.

14. A non-transitory computer-readable storage medium storing a program for causing a computer to execute a method, the method comprising:
generating intermediate data for each page by analyzing page description language (PDL) data;
acquiring a number of colors used in a page of color data of the intermediate data;
determining a gray data conversion method from a first gray data conversion method and a second gray data conversion method, the first gray data conversion method converting the color data into gray data while assigning, based on the acquired number of colors, different gray values to the colors used in the color data, the second gray data conversion method converting the color data into gray data by combining a plurality of color components of the color data at a predetermined ratio; and
converting the color data into the gray data by using the determined gray data conversion method.

15. The non-transitory computer-readable storage medium according to claim 14, wherein, in a case where the acquired number of colors exceeds a threshold, the determining determines the gray data conversion method to the second gray data conversion method and, in a case where the acquired number of colors is less than or equal to the threshold, the determining determines the gray data conversion method to the first gray data conversion method.

16. The non-transitory computer-readable storage medium according to claim 14, wherein the first gray data conversion method converts the color data into the gray data while assigning the gray values with an equal difference to the plurality of colors used in the color data.

17. The non-transitory computer-readable storage medium according to claim 14, further comprising generating intermediate data for each page by analyzing page description language (PDL) data,
wherein the acquiring acquires the number of colors by counting a number of colors used in a page of the intermediate data.

18. The non-transitory computer-readable storage medium according to claim 14, wherein the converting converts color data of the intermediate data into gray data of the intermediate data.

19. The non-transitory computer-readable storage medium according to claim 18, further comprising generating image data by performing rendering processing based on the converted gray data of the intermediate data.

* * * * *